J. SMITH & E. T. THURSTON.
Velocipede.
No. 196,943. Patented Nov. 6, 1877.
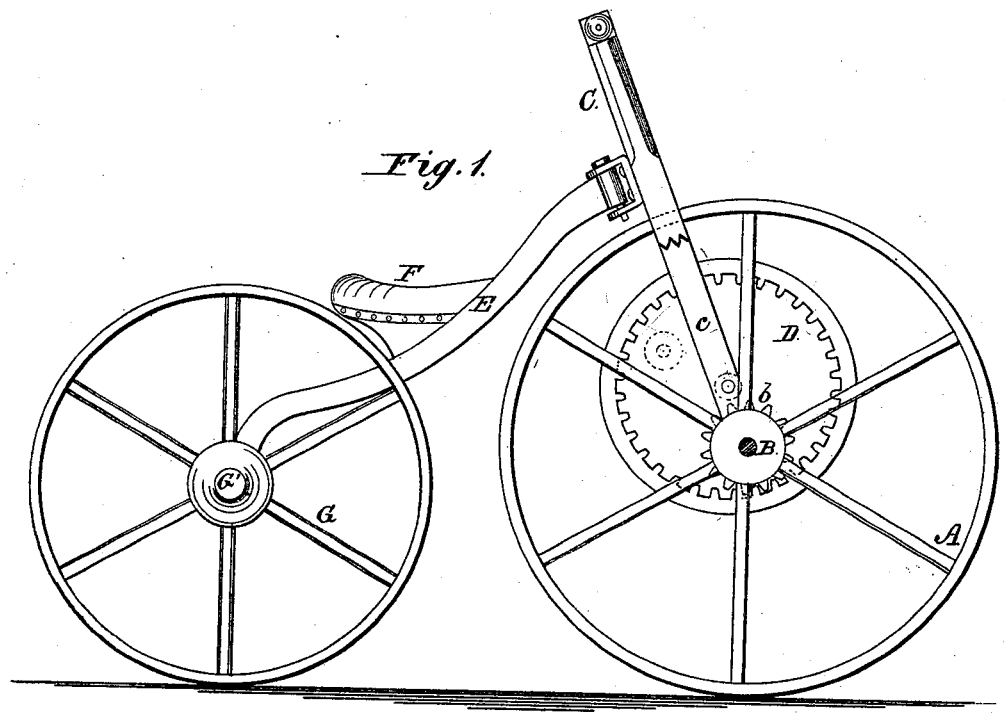
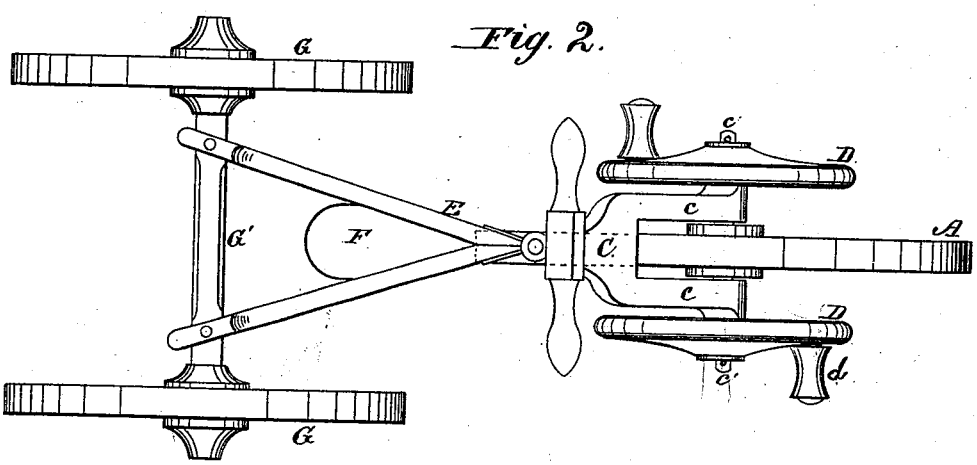

UNITED STATES PATENT OFFICE.

JOHN SMITH AND EDWARD T. THURSTON, OF ROCKVILLE CENTRE, N. Y.

IMPROVEMENT IN VELOCIPEDES.

Specification forming part of Letters Patent No. 196,943, dated November 6, 1877; application filed January 29, 1877.

*To all whom it may concern:*

Be it known that we, JOHN SMITH and E. T. THURSTON, of Rockville Centre, Queens county, New York, have invented an Improved Velocipede, of which the following is a specification:

Figure 1 of drawings is a side elevation, parts being broken away. Fig. 2 is a plan view.

The invention will first be described in connection with the drawing, and then pointed out in the claim.

A represents the front or drive wheel, which is fast on the axle B, the latter being journaled in the lower ends of the prongs c c of the swiveled bar C, while the wheel A is arranged between said prongs.

On each end of the axle B is a pinion, b, that gears with an internally-toothed wheel, D, pivoted loosely on a stud, c', projecting from the sides of the prong c.

E is the reach carrying seat F, and G' are the rear wheels and axle. d d are treadles on the wheels D, by which the rider may operate the pinions b, that turn the axle B and wheel A.

We are aware that internally-toothed wheels have been used to drive internal pinions fast to a shaft, and that said device has been employed to propel a velocipede by hand; but

What we claim is—

A velocipede having drive-shaft fast to wheel A, and provided with end pinions b, the latter being operated by internally-geared wheels D, loosely pivoted on side studs c', and provided with treadles d, as shown and described.

JOHN SMITH.
EDWARD T. THURSTON.

Witnesses:
C. SEDGWICK,
ALEX. F. ROBERTS.